US007774092B2

(12) United States Patent
Rundel

(10) Patent No.: US 7,774,092 B2
(45) Date of Patent: Aug. 10, 2010

(54) PROCESS FOR THE PRESS CONTROL OF A POWDER METAL PRESS IN THE PRODUCTION OF MOLDINGS

(75) Inventor: Albert Rundel, Saulgau-Fulgenstadt (DE)

(73) Assignee: Maschinenfabrik Lauffer GmbH & Co., KG, Horb (DE)

( * ) Notice: Subject to any disclaimer, the term of this patent is extended or adjusted under 35 U.S.C. 154(b) by 400 days.

(21) Appl. No.: 12/035,651

(22) Filed: Feb. 22, 2008

(65) Prior Publication Data

US 2008/0206384 A1 Aug. 28, 2008

(30) Foreign Application Priority Data

Feb. 27, 2007 (EP) ................................ 07003955

(51) Int. Cl.
*G06F 19/00* (2006.01)
*B28B 17/00* (2006.01)

(52) U.S. Cl. ...................................... 700/206; 425/140

(58) Field of Classification Search ................ 700/206; 425/140

See application file for complete search history.

(56) References Cited

U.S. PATENT DOCUMENTS

| | | | | |
|---|---|---|---|---|
| 3,946,212 | A * | 3/1976 | Nakao et al. | 702/84 |
| 4,354,811 | A * | 10/1982 | Marmo | 425/140 |
| 5,582,063 | A | 12/1996 | Hofele et al. | |
| 5,748,322 | A * | 5/1998 | Konder et al. | 356/394 |
| 6,074,584 | A | 6/2000 | Hinzpeter et al. | |
| 7,006,948 | B2 * | 2/2006 | Allen | 702/183 |
| 7,147,820 | B2 | 12/2006 | Hinzpeter et al. | |

FOREIGN PATENT DOCUMENTS

| | | |
|---|---|---|
| DE | 2 264 247 | 7/1974 |
| DE | 197 17 217 | 10/1998 |
| DE | 101 42 623 | 4/2003 |
| EP | 1 287 977 | 3/2003 |
| EP | 1 602 421 | 12/2005 |
| GB | 1 475 272 | 6/1977 |
| GB | 2179588 A * | 3/1987 |
| JP | 61-060296 | 3/1986 |
| JP | 62-280302 | 12/1987 |

OTHER PUBLICATIONS

European Search Report for corresponding Application No. 07 00 3955 dated Jul. 25, 2007.

* cited by examiner

*Primary Examiner*—Albert DeCady
*Assistant Examiner*—Sivalingam Sivanesan
(74) *Attorney, Agent, or Firm*—Renner, Otto, Boisselle & Sklar, LLP

(57) ABSTRACT

The invention concerns a press for the production of pressed moldings of powdery or granulate materials, as well as a process for controlling the press where a correction of the ram stroke of the press is initiated depending on the association of actual dimensions of the molding with certain tolerance ranges to which different valences have been assigned, and where, depending on the valence in question, no correction, an immediate correction, or a delayed correction of the ram stroke is effected.

10 Claims, 3 Drawing Sheets

PROCESS FOR THE PRESS CONTROL OF A POWDER METAL PRESS IN THE PRODUCTION OF MOLDINGS

CROSS-REFERENCE TO RELATED APPLICATION

The present application claims priority under 35 U.S.C. §119 to European Patent Application No. 07 003 955.7, filed on Feb. 27, 2007, the entire disclosure of which is incorporated herein by reference.

TECHNICAL FIELD OF THE INVENTION

The invention relates to a process for controlling a press during the production of pressed moldings made of powdery or granulate materials, with a pressing tool, an electronic control system, and, following the pressing tool, a test station that is isolated from the vibrations generated by the press, for the automatic measuring of dimensions and sorting of moldings, where the material is filled into a die and is compressed by the movement of at least one ram that can be moved relative to the mold.

DESCRIPTION OF THE RELATED ART

It is known to produce moldings made of carbide, ceramic, sintered metal or similar material by means of presses. By means of a pressing tool, the presses shape the powdery or granulate material into a molding that is then subjected to a sintering operation. One of the most important molding processes is axial pressing. In its simplest form, a pressing tool designed for this purpose consists of an upper and a lower ram and a die matrix made of hardened steel or carbide. After the die is filled with powdery material, for example, the powder is compressed by the rams of the pressing tool. Here, a distinction is made between unilateral or bilateral pressing, i.e. either only the upper ram or the lower ram is moved, or both are moved at once. The at least one ram that is moved is powered by a suitable power drive, either mechanically or hydraulically.

In a hydraulic press, as specified in DE 197 17 217 C2 for example, one upper and one lower press cylinder are each connected with the upper and the lower ram that are associated with a matrix bore. With the lower ram moved up into the matrix bore, the powder is filled into the matrix bore by means of a filling scoop. The precise dosage is achieved by subsequently moving up the lower ram by a given amount, and by scraping off the powder piled up above the matrix surface. Then, by means of the upper ram entering the matrix from above, the powder is compressed, in the course of which the lower ram can be adjusted as required.

When producing pressed moldings, it is a decisive factor that the individual moldings of a series have an approximately identical density with essentially constant dimensions. This makes it necessary to keep the maximum pressure achieved in the end position of—for example—the upper ram as uniform as possible during each pressing process. It is natural that the maximum pressing force during the production of the moldings is subject to spreading, depending on the ram stroke that is determined by the filling quantity and the distribution of the powder in the mold. Due to changes of the powder because of environmental factors, slight differences in the filling quantity, or an inhomogeneous distribution of the powder in the mold, moldings produced in sequence may have a different weight or different dimensions after pressing. Even slight deviations from each other or from given nominal values may lead to an increased quota of waste after the sintering.

For example, from DE 101 42 623 C2 it is known to determine from time to time the frequency distribution of the pressure measured during each pressing process by means of a pressure cell, and to determine the standard deviation from that. As is commonly known, the standard deviation lies between the turning points of the gaussian distribution curve and is a measure for the spread of the pressure force, and therefore an indicator for the spread of weight and dimensions of the molding. According to the process described there, if the measured standard deviation of the pressure force deviates from a given minimum deviation, at least one parameter of the pressing process is changed from time to time.

This type of statistical process control serves to continually monitor the pressing process and to correct it if necessary. The monitoring of the production by means of statistical process control (SPC) is based on the testing of samples of pressed moldings after a partial lot of a production lot has been produced. A process control that is coupled to such testing of the moldings serves essentially for eliminating systematic influences and acts on the pressing process with a certain delay. It is a distinct disadvantage of this frequently applied process that critical deviations that may occur are recognized too late, and that the correction of the ram stroke and/or the pressing force is initiated too late. There is a danger that the production lot will then have a correspondingly large number of moldings with critical dimensions that, during subsequent sample testing in the course of quality control or product acceptance tests with statistical evaluation, for example, might justify a rejection of the production lot. Moldings with tolerances in a range of a few hundredths will therefore not hold up under common evaluation methods. This would mean that, although they can be produced in principle, they do not meet the requirements when the lot is tested statistically, and would therefore have to be considered impossible to produce.

Similar powder metal presses for the production of moldings and press control processes for such presses are also known from the patent specification of U.S. Pat. No. 4,354,811 and the patent disclosure DE 2 264 247.

The document U.S. Pat. No. 4,354,811 discloses a hydraulic pressing device with several cavities and press rams for the production of pressed parts. The pressing device is equipped with an automatic test station that measures the height of all pressed parts after the pressing process and rejects pressed parts exceeding the tolerances by sorting them. Depending on the measured height, the test station also automatically corrects the filling amount of the cavities when necessary by changing the position of the counterpunch of the press rams by means of a motor drive. The test station is separate from the press station and therefore isolated from its vibrations. It is fed the pressed parts to be tested by a belt conveyor.

The document DE 2 264 247 A describes a process for producing moldings with tight height tolerances by means of a conventional press. After pressing, the height of a pressed molding is measured continuously by means of a scanner that immediately triggers an adjustment of the stroke of the press ram when the set tolerance values are exceeded. For this purpose, the measuring station is coupled with the press control and interacts with a pressure gauge for the press rams that also changes the filling amounts of the cavities automatically.

SUMMARY OF THE INVENTION

The invention addresses the problem of devising a process for controlling a powder metal press for the production of pressed moldings that makes it possible to produce moldings with constant dimensions within a given tolerance, where systematic and random influences on the pressing process of moldings pressed in sequence are counteracted early so that the spread of the dimensions of the moldings in the production lot is reduced.

In order to apply the control process according to the invention for a powder metal press for producing pressed moldings made of powdery or granulate materials, a press is used with a pressing tool that has a die into which the material is filled, and with at least one ram that can be moved relative to the die, and where, following the pressing tool, a test station that is isolated from the vibrations generated by the press is provided for the automatic measuring and sorting of moldings. In addition, the press has an electronic control system and a device for measuring and automatically correcting the stroke of the ram. The control system and/or the test station are equipped with a storage device in which dimensions measured by the test station can be stored together with nominal dimensions and tolerances associated with the nominal dimensions. For controlling the press, the control system can automatically compare the actual dimensions continually with the nominal dimensions and with the limits determined by the permissible tolerances, and, depending on the results, acts on the parameters of the pressing process, in particular the stroke of the press ram.

Depending on the position of each measured dimension relative to the corresponding nominal value, the electronic control system initiates an automatic correction of the ram stroke. The dimensions of the molding can be measured by means of either contact or non-contact methods. However, it is important that the measuring of one or several tolerance-critical dimensions of the molding in the test station is not affected by vibrations originating from the press. This is ensured by isolating the test station from vibrations of the press. The ram stroke is controlled by a central control system that is equipped with a storage device for storing press operation parameters, pressing tool parameters, and nominal as well as actual variables of state of the moldings. The central control system and the storage device may be components of the press, of the pressing tool, of the test station, or of an attached operating device.

Especially well suited is a test station that is external to the press and has a weighing device as well as one or several measuring devices for tolerance-critical dimensions. Mechanically, the press-external test station is not connected with the press and therefore protected against interfering influences of the press. Each of the pressed moldings is fed into the test station automatically directly after the pressing process. This can be accomplished by a belt conveyor, for example, or, with preference, by means of a pick-place handling system or a similar device. The purpose of precise positioning of the parts for measuring tolerance-critical dimensions is served especially well by a handling system. With the weighing device, the weight of the molding can be measured in order to determine its density. It offers advantages if the test station is equipped with more than one measuring device for measuring several dimensions and, in the interest of precise measurement, with an automatic cleaning device for the weighing device and/or the measuring device. This makes it possible to measure several dimensions at once, which has a positive effect on the cycle time of the test station. The cleaning device is able to remove particles shed by the moldings in the test station by means of blowing, suction, or mechanical wiping. Besides a precise weighing of the molding, this also permits precise measuring of its tolerance-critical dimensions because it prevents the molding from tilting during the measurements.

The test station is also equipped with a sorting device for the moldings. After the measuring of weight and/or tolerance-critical dimensions and association with one of the tolerance ranges, the moldings can be automatically sorted by means of the sorting device, depending on the valence of the tolerance range into which they fall. Moldings that cannot be associated with any of the given tolerance ranges, can be sorted out of the production lot in a simple and reliable way.

According to the process proposed by the invention, the control of such a metal powder press involves the following steps:

Measuring and automatic correction of the ram stroke by means of the electronic control system, following the procedure below:

Setting a total tolerance range determined by limit values for one or several dimensions of the molding that are to be tested;

Dividing the total tolerance range for such a dimension into a non-critical tolerance range and a directly adjacent critical tolerance range, both arranged around a nominal value;

Subdividing the critical tolerance range into a first and an adjacent second action range of different valence, with a higher valence assigned to the second action range than to the first action range.

Storing the nominal values together with the tolerance ranges and the action ranges for the dimensions to be tested in a storage device of the test station;

Measuring the dimensions of the molding that are to be tested in an automatic test station immediately after the pressing process of the molding in question;

Storing of the measured dimensions in each case in the storage device of the test station;

Associating the dimensions measured last in each case, depending on their deviation form the corresponding nominal value, with the non-critical tolerance range or one of the action ranges of the critical tolerance range; and Initiating an automatic correction of the ram stroke in dependence on the valence of the action range with which the dimension in question is associated, either immediately or with a delay.

Accordingly, this process controls or regulates the production process in such a way that the monitoring as well as the control process are fully automatic, with the dimensions of each pressed molding being tested and used for the control process. The dimensional accuracy of the moldings is tested 100% immediately after each molding is removed from the die of the pressing tool, and while the next molding is being pressed. Accordingly, in case of dimensional deviations of the tested molding, and depending on the valence of the corresponding tolerance range, the pressing of the next but one molding can already be influenced. As a consequence, systematic influences are detected early, and they can be counteracted, for example an expansion of the press ram due to a temperature change, so that only a few moldings are produced that are not correct. In order to change the axial dimension of the next but one molding, the ram stroke is changed so that the dimensions of the next but one molding are closer to the nominal value for the molding, and can preferably be associated with a tolerance range that has a lower valence compared with the currently measured molding.

Therefore, the control process does not start only after a number of moldings are not correct. Rather, the control process is already applied with deviations that are still within the limits, in particular in a tolerance range with non-critical valence. The dimensions of the molding are changed constantly step-by-step by changing the ram stroke from a tolerance range with critical valence to a tolerance range with a less critical valence, in particular a tolerance range with the desired non-critical valence, so that the spread of the measured dimensions of the moldings in the production lot is distinctly reduced.

It offers advantages if, for determining the tolerance ranges for the dimensions of the molding, maximum and minimum limits are used that are more restrictive than the given absolute maximum and minimum dimensional values. Moldings with dimensions that fall between said limits and the absolute dimensional values are considered waste and are rejected. In the course of the 100% testing they are detected and eliminated from the production lot.

Preferably, in the course of the process, a correction of the ram stroke is not initiated when the dimensions in question are associated with a first tolerance range; however, a correction of the ram stroke is initiated when the dimensions in question are associated with a second tolerance range that is adjacent to the first tolerance range; and the ram stroke is stopped when the dimensions in question are not associated with the first or the second tolerance range. Here, the first tolerance range is the tighter tolerance range around the nominal value for the molding. The first tolerance range is understood as the target tolerance range during the pressing of the molding, the goal being that the random spread, one or two times the standard deviation of the gaussian curve, is located within this tolerance range. A correction of the ram stroke is not necessary in this case, and therefore not provided for.

The first tolerance range is followed by a second tolerance range of higher valence that extends all the way to the set permissible limit. Dimensions that cannot be associated with the first or second tolerance range are not permissible so that the ram stroke is stopped in this case because a correction usually requires the change of several process parameters. In the second tolerance range, a dimensional change can be effected by the adjustment of a single process parameter, i.e. the correction of the ram stroke.

It is also an advantage if the second tolerance range is subdivided into a first action range bordering on the first tolerance range and a second action range adjacent to the first action range. Compared with the first action range, the second action range is assigned a higher valence, with each dimension associated with the second action range triggering an immediate correction, while a sequence of several—preferably three—dimensions associated with the first action range will effect a correction of the ram stroke. If a correction of the ram stroke does not produce an improvement of the dimensional accuracy of the molding, more far-reaching measures are required.

If a dimension falls in the first less critical action range, several—preferably three—of the following moldings are measured as a first step in order to determine if this is a systematic or a random effect. If it is a systematic influence that causes a sequence of several moldings to be associated with the first action range, the ram stroke is corrected in order to influence the dimensions of subsequent moldings to move in the direction of the first tolerance range.

It is expedient to generate a warning signal and/or stop the ram stroke with the occurrence of several—preferably two—dimensions in sequence that are associated with the second action range. The warning may consist of a visual and/or an acoustic signal. Then, additional measures for improving the dimensional accuracy can be initiated in order to reduce the spread of the dimensions of the moldings in the production lot.

Preferably, moldings with dimensions that exceed the second action range, i.e. cannot be associated with the first or second tolerance range, are sorted out automatically after the testing process. This eliminates critical moldings from the production process in order to save unnecessary costs for a subsequent sintering process with or without subsequent sizing.

With the proposed process, an automatic 100% test with automatic correction for the production lot is performed that renders random sampling superfluous and should eliminate waste.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
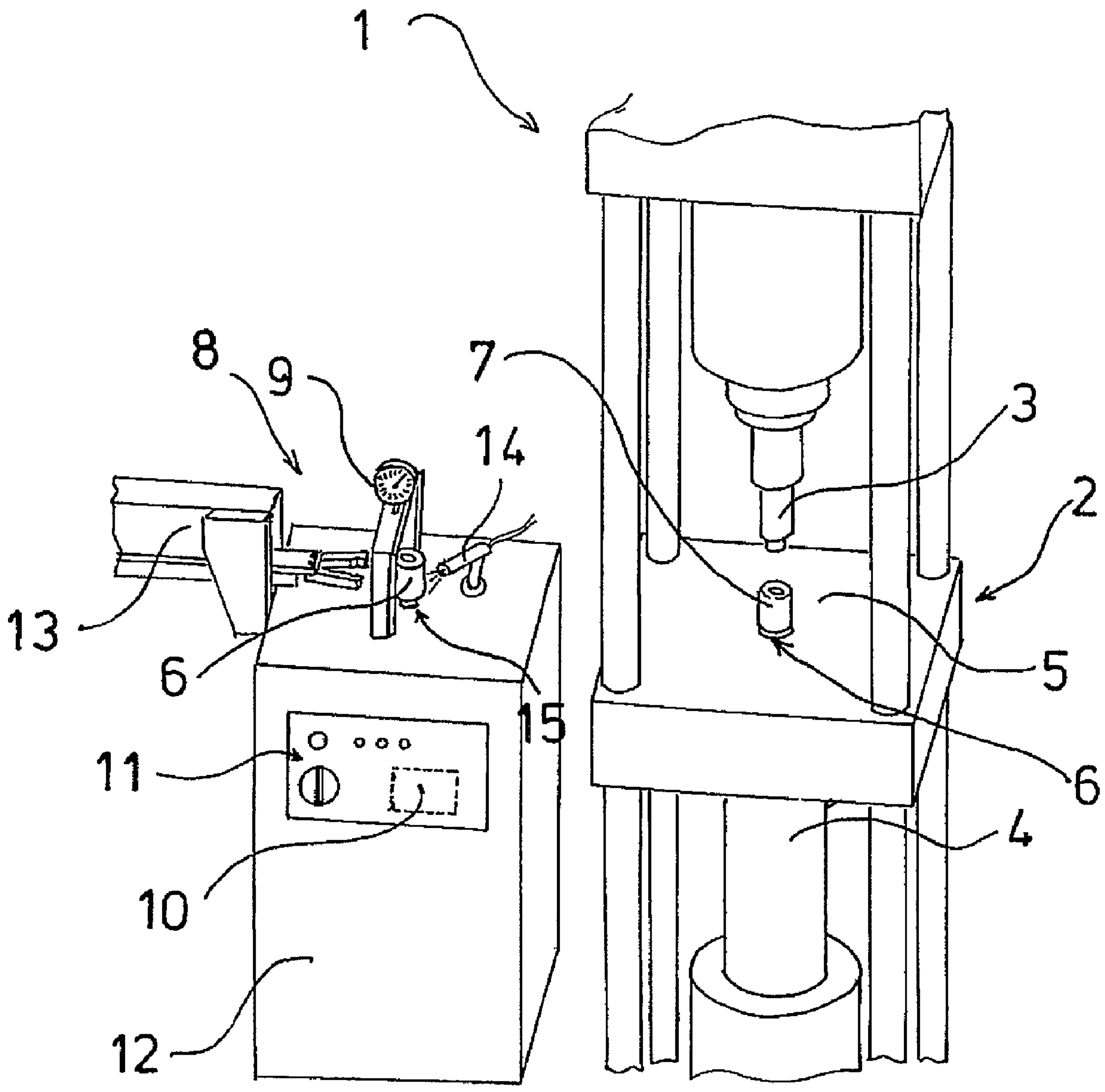
FIG. 1 shows a powder metal press according to the invention in a basic schematic view.

The metal powder press 1 according to the invention shown symbolically in FIG. 1, with a pressing tool 2, has an upper ram 3 and a lower ram 4 that can be pushed into a matrix 5. The matrix 5 contains a die 6 for a molding 7, shown after pressing and removal from the die in the figure. A molding 7 pressed immediately before is inserted in a test station 8 that is isolated from the press 1. With a measuring device 9, shown symbolically, for measuring height in particular, the molding 7 is measured in an axial direction. An automatic weighing process may be also performed there, before or afterwards. The measured tolerance-critical measurements 22 are stored in a storage device 10 of a control system 11 of an operating device 12 of the press 1. The ram stroke of the upper ram 3 and of the lower ram 4 can be influenced by means of the control system 11. A gripping device 13 is provided for the automatic transfer of the molding 7 from the pressing tool 2 located in the press 1 to the test station 8. Transportation to a provided electronic weighing device (not shown in the figure) for measuring the weight of the molding 7 is also accomplished by the gripping device 13 that is also able to sort moldings 7 that are outside the tolerance ranges 16, 17. In addition, the test station 8 is equipped with a cleaning device 14 in the form of a blower device that cleans powder residues from a holder 15 for the molding to be measured before a molding 7 is placed therein. The same or an additional cleaning device 14 may also serve for cleaning the weighing device.

Figure 2:
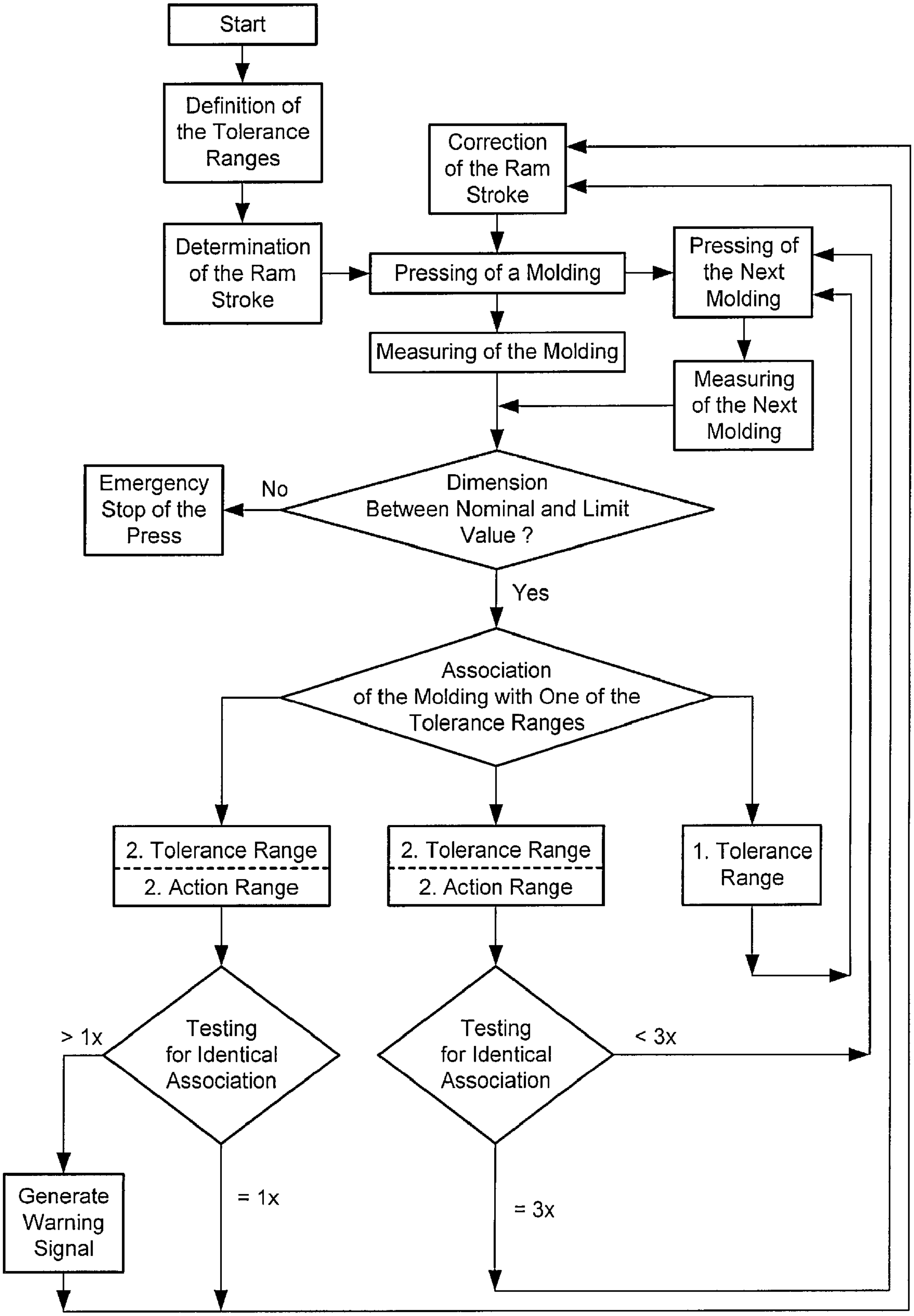
FIG. 2 shows a flow diagram for monitoring the dimensional accuracy of moldings and for controlling the ram stroke of a corresponding press.
Figure 3:
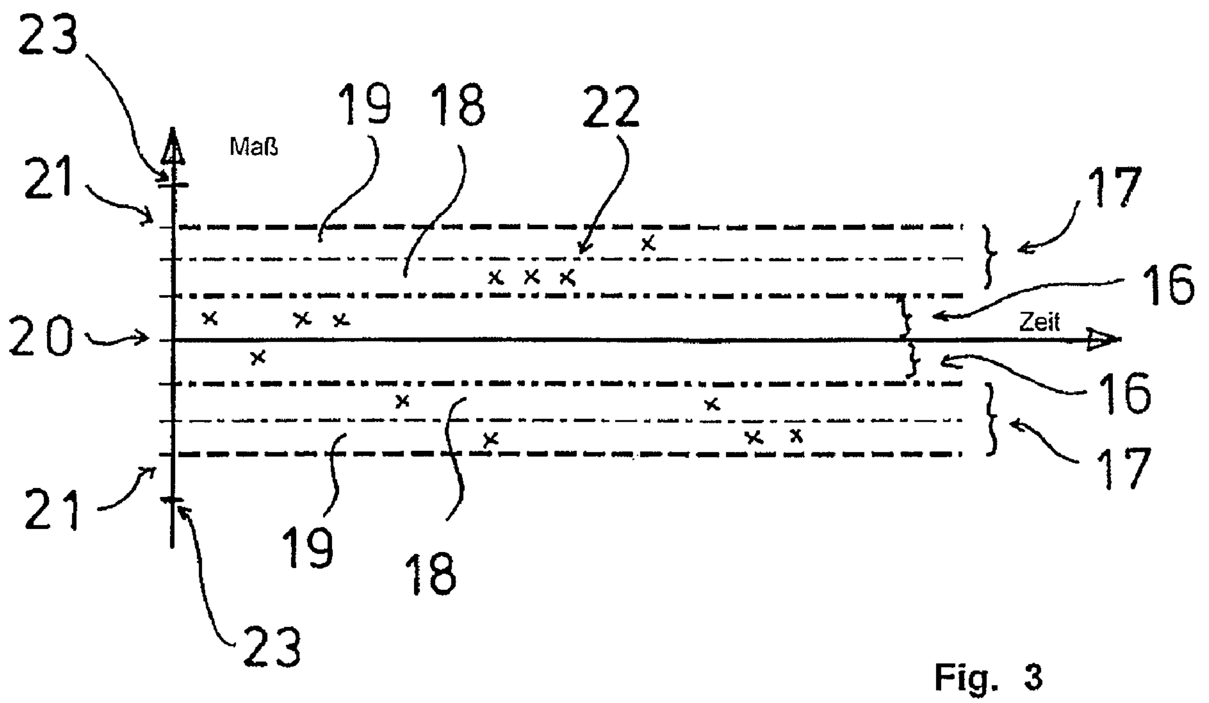
FIG. 3 shows a view of tolerance ranges of different valence associated with a nominal value.

FIG. 2 shows a flow diagram of the process according to the invention for controlling a metal powder press 1. Starting with the given nominal dimensions 20 and given absolute dimensions 23, limit values 21 for the molding 7 are determined that are reduced in relation to the absolute dimensions 23. In addition, between the nominal dimension 20 and the limit value 21, first and second tolerance ranges 16, 17 as well as action ranges 18, 19 for the second tolerance range 17 are determined, as shown in FIG. 3, and the ram strokes of the rams 3, 4 of the pressing tool 2 are determined. After pressing, a molding 7 is transferred to the test station 8 and another molding 7 is pressed while the dimensions of the previously pressed molding 7 are measured in the test station 8, parallel to the pressing process of the next molding 7. Depending on their deviation form the nominal value 20, the dimensions are associated with the first tolerance range 16 or the second tolerance range 17, more specifically with a first action range 18 or a second action range 19 of the second tolerance range 17.

Depending on the valence of the tolerance range 16, 17 concerned, or on the valence of the action range 18, 19 concerned, no correction, an immediate correction, or a delayed correction of the ram stroke takes place. If the dimensions in question are associated with the first tolerance range 16, there is no correction of the ram stroke prior to the pressing of another (next but one) molding 7. If the measured dimension in question is associated with the second tolerance range, the ram stroke is corrected either immediately or with a delay, depending on whether the measurement is associated with the second action range 19 that is remote from the first tolerance range 16 or with the first action range 18 that is close to the first tolerance range 16. Every dimension 22 that is associated with the second action range 19 effects an immediate correction of the ram stroke while a sequence of several—preferably three—dimensions 22 associated with the first action range 18 will effect a correction of the ram stroke.

Two dimensions in sequence that are associated with the second action range 19 will produce a warning signal since there was apparently no improvement following an adjustment. In general, it should be noted, as indicated in FIG. 2, that the correction of the ram stroke will not become effective until the next but one molding. A molding 7 exceeding the limit values 21 effects an immediate stop of the press. Such an 'emergency stop' is a common feature.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A method for controlling a press during the production of pressed moldings made of powdery or granulate materials, with a pressing tool, an electronic control system, and, following the pressing tool, a test station that is isolated from the vibrations generated by the press, for the automatic measuring of dimensions and sorting of moldings where the material is filled into a die and is compressed by the movement of at least one ram that can be moved relative to the die, comprising:

measuring and automatic correction of the ram stroke by means of the electronic control system, following the procedure below:

setting a total tolerance range determined by limit values for one or several dimensions of the molding that are to be tested;

dividing the total tolerance range for such a dimension into a non-critical tolerance range and a directly adjacent critical tolerance range, both arranged around a nominal value;

subdividing the critical tolerance range into a first and an adjacent second action range of different valence, with a higher valence assigned to the second action range than to the first action range;

storing the nominal values together with the tolerance ranges and the action ranges for the dimensions to be tested in a storage device of the test station;

measuring the dimensions of the molding that are to be tested in an automatic test station immediately after the pressing process of the molding in question;

storing of the measured dimensions in each case in the storage device;

associating the dimensions measured last in each case, depending on their deviation from the corresponding nominal values, with the non-critical tolerance range or one of the action ranges of the critical tolerance range; and initiating an automatic correction of the ram stroke in dependence on the valence of the action range with which the dimension in question is associated, either immediately or with a delay.

2. A method as claimed in claim 1, wherein, for determining the tolerance ranges for the dimensions, limit values for the molding are used that are reduced in relation to given absolute maximum and minimum dimensions of the molding.

3. A method as claimed in claim 1, wherein a correction of the ram stroke is not initiated when the dimensions in question are associated with a first tolerance range;

a correction of the ram stroke is initiated when the dimensions in question are associated with a second tolerance range that is adjacent to the first tolerance range;

the ram stroke is stopped when the dimensions in question are not associated with the first or the second tolerance range.

4. A method as claimed in claim 1, wherein the second tolerance range is subdivided into a first action range bordering on the first tolerance range and a second action range adjacent to the first action range that are assigned different valences, with any dimensions associated with the second action range or a sequence of a dimensions associated with the first action range effecting an immediate correction of the ram stroke.

5. A method as claimed in claim 4, wherein a sequence of dimensions associated with the second action range will initiate a warning signal and/or a stop of the ram stroke.

6. A method as claimed in claim 5, wherein the sequence of dimensions associated with the second action range consists of two dimensions.

7. A method as recited in claim 4, wherein the sequence of dimensions consists of a sequence of three dimensions.

8. A method as claimed in claim 1, wherein the moldings with dimensions that cannot be associated with the first or second tolerance range are automatically sorted out after the test station.

9. A method as claimed in claim 1, characterized in that the dimensions of the moldings are measured in a test station that is remote from the pressing tool, preferably external to the press.

10. A method as claimed in claim 1, wherein the pressed moldings are transported to the test station automatically, and that the dimensions are automatically measured by a measuring device of the test station.

* * * * *

UNITED STATES PATENT AND TRADEMARK OFFICE

CERTIFICATE OF CORRECTION

PATENT NO. : 7,774,092 B2
APPLICATION NO. : 12/035651
DATED : August 10, 2010
INVENTOR(S) : Albert Rundel It is certified that error appears in the above-identified patent and that said Letters Patent is hereby corrected as shown below:

In the Specifications:

Col 3, line 15 should read -- "for determining and automatically correcting the stroke of the".

Col 4, line 12 should read -- "Determining and automatic correction of the ram stroke by".

In the Claims:

Claim 1, Col 7, line 56 should read -- "determining and automatic correction of the ram stroke by".

Signed and Sealed this
Twenty-fifth Day of June, 2013

Teresa Stanek Rea
*Acting Director of the United States Patent and Trademark Office*